United States Patent
Kim et al.

(10) Patent No.: US 10,330,983 B2
(45) Date of Patent: Jun. 25, 2019

(54) LIQUID CRYSTAL DISPLAY AND METHOD FOR MANUFACTURING THE SAME

(71) Applicant: Samsung Display Co., Ltd., Yongin-si (KR)

(72) Inventors: Jang-II Kim, Asan-si (KR); Keun Woo Park, Incheon (KR); Jong Hak Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/457,114

(22) Filed: Mar. 13, 2017

(65) Prior Publication Data
US 2017/0293173 A1 Oct. 12, 2017

(30) Foreign Application Priority Data
Apr. 12, 2016 (KR) ........................ 10-2016-0044929

(51) Int. Cl.
*G02F 1/1337* (2006.01)
*G02F 1/1341* (2006.01)
(Continued)

(52) U.S. Cl.
CPC ........ *G02F 1/13378* (2013.01); *G02F 1/1341* (2013.01); *G02F 1/1368* (2013.01); *G02F 1/13439* (2013.01); *G02F 1/133711* (2013.01); *G02F 1/134309* (2013.01); *G02F 1/136286* (2013.01); *G02F 2001/13415* (2013.01); *G02F 2001/13629* (2013.01);
(Continued)

(58) Field of Classification Search
CPC ..... G02F 2001/13685; G02F 1/133788; G02F 2001/13415
See application file for complete search history.

(56) References Cited

U.S. PATENT DOCUMENTS

2004/0233374 A1* 11/2004 Yamazaki ............. G02F 1/1341
349/153
2011/0141416 A1  6/2011 Kim et al.
(Continued)

FOREIGN PATENT DOCUMENTS

KR  10-2011-0067574  6/2011
KR  10-2012-0088646  8/2012
(Continued)

*Primary Examiner* — Kendrick Hsu
(74) *Attorney, Agent, or Firm* — H.C. Park & Associates, PLC

(57) ABSTRACT

A method for manufacturing a liquid crystal display, and the display formed thereby, the method including forming a first display panel including a thin film transistor and a pixel electrode connected to the thin film transistor, the thin film transistor including an auxiliary electrode, a semiconductor layer disposed on the auxiliary electrode, and a gate electrode disposed on the semiconductor layer, forming a second display panel including a common electrode, forming a liquid crystal layer including a plurality of liquid crystal molecules on the first display panel or the second display panel, bonding the first display panel and the second display panel, applying different voltages to the pixel electrode and the common electrode, and irradiating ultraviolet rays in the liquid crystal layer, to initially align the liquid crystal molecules.

9 Claims, 8 Drawing Sheets

(51) Int. Cl.
 *G02F 1/1343* (2006.01)
 *G02F 1/1362* (2006.01)
 *G02F 1/1368* (2006.01)

(52) U.S. Cl.
 CPC ........... *G02F 2001/133757* (2013.01); *G02F 2001/136295* (2013.01); *G02F 2201/121* (2013.01); *G02F 2201/123* (2013.01)

(56) References Cited

U.S. PATENT DOCUMENTS

| | | | |
|---|---|---|---|
| 2015/0062517 A1* | 3/2015 | Lee | G02F 1/133711 349/124 |
| 2015/0084035 A1 | 3/2015 | Kim et al. | |
| 2015/0185158 A1 | 7/2015 | Lim et al. | |

FOREIGN PATENT DOCUMENTS

| | | |
|---|---|---|
| KR | 10-2015-0033155 | 4/2015 |
| KR | 10-2015-0078515 | 7/2015 |
| KR | 10-2015-0126509 | 11/2015 |

* cited by examiner

LIQUID CRYSTAL DISPLAY AND METHOD FOR MANUFACTURING THE SAME

CROSS-REFERENCE TO RELATED APPLICATION

This application claims priority from and the benefit of Korean Patent Application No. 10-2016-0044929, filed on Apr. 12, 2016, which is hereby incorporated by reference for all purposes as if fully set forth herein.

BACKGROUND

Field

The invention relates generally to a liquid crystal display and a manufacturing method thereof, and, more particularly, to liquid crystal displays and methods of manufacturing the display that initially align the liquid crystals in the display.

Discussion of the Background

A liquid crystal display (LCD), which is one of the types of flat panel displays most widely used, includes two display panels on which electric field generating electrodes such as a pixel electrode and a common electrode are formed, and a liquid crystal layer interposed therebetween. The liquid crystal display displays an image by generating an electric field on the liquid crystal layer by applying a voltage to the electric field generating electrodes, aligning the liquid crystal molecules of the liquid crystal layer through the generated electric field, and controlling polarization of incident light.

Among the LCDs, a vertical alignment (VA) mode LCD, which aligns LC molecules such that their long axes are perpendicular to the panels in the absence of an electric field, has the advantages of a high contrast ratio and a wide reference viewing angle.

In order to obtain a wide viewing angle in a vertical alignment (VA) mode liquid crystal display, a plurality of domains with different alignment directions such as tilted alignments, may be formed for one pixel.

One example for forming a plurality of domains, including those with tilted alignments, is a method of forming cutouts such as slits on a field generating electrode. This method may form a plurality of domains by rearranging liquid crystal molecules due to a fringe field generated between an edge of the cutout and a field generating electrode facing the same.

In the case of a high-resolution liquid crystal display, a channel of a thin film transistor may include an oxide semiconductor with high mobility. When, during operation of the display, an initial alignment voltage is applied to a pixel electrode through a thin film transistor including an oxide semiconductor, the transistor is quickly turned on/off. During this brief period of time that the transistor is turned off, the data voltage is not maintained by the pixel electrode and the voltage at the pixel electrode may be coupled to the voltage of the common electrode, which is lower. Accordingly, a sufficient voltage difference for arranging the liquid crystal molecules to have a pre-tilt might not be generated in the liquid crystal layer and the desired initial alignment may not be generated during a transistor off time upon application of an initial alignment voltage to the pixel electrode.

The above information disclosed in this Background section is only for enhancement of understanding of the background of the inventive concepts, and, therefore, it may contain information that does not form the prior art that is already known in this country to a person of ordinary skill in the art.

SUMMARY

Liquid crystal displays and methods of manufacturing the display according to the principles of the invention improve the response speed of the liquid crystal display and reduce afterimages. For example, when an electric field is generated in a liquid crystal layer after the liquid crystal display is manufactured, the liquid crystal molecules may be instantaneously or nearly instantaneously inclined in a predetermined direction by a pre-tilt.

In order to make the response speed of the liquid crystal fast while also providing a wide viewing angle, the inventors have developed a method of pre-tilting liquid crystal molecules when an electric field is not applied. In order for the liquid crystal molecules to have pre-tilts in various directions, an alignment layer with various alignment directions may be used, or an alignment aid for pre-tilting the liquid crystal molecules may be added to the liquid crystal layer, an electric field may be applied to the liquid crystal layer during manufacture, and the alignment aid may be cured during this method of manufacturing the device. The alignment aid is cured due to heat or light such as ultraviolet rays and the like, and may allow the liquid crystals to be pre-tilted in a predetermined direction during subsequent operation of the device without the application of a voltage during the operation of the device to achieve the pre-tilt. The voltage is applied to each of the electric field generating electrodes to generate the electric field in the liquid crystal layer.

Accordingly, devices made and methods carried out according to the principles of the invention improve the response speed of a liquid crystal display by initially aligning liquid crystal molecules of a high-resolution liquid crystal display so that they may have a pre-tilt that exists, during the operation of the device, in the absence of the application of an electric field.

Additional aspects will be set forth in the detailed description which follows, and, in part, will be apparent from the disclosure, or may be learned by practice of the inventive concepts.

According to one aspect of the invention, a method for manufacturing a liquid crystal display includes forming a first display panel including a thin film transistor and a pixel electrode connected to the thin film transistor, the thin film transistor including an auxiliary electrode, a semiconductor layer disposed on the auxiliary electrode, and a gate electrode disposed on the semiconductor layer, forming a second display panel including a common electrode, forming a liquid crystal layer including a plurality of liquid crystal molecules on the first display panel or the second display panel, bonding the first display panel and the second display panel, applying different voltages to the pixel electrode and the common electrode, and irradiating ultraviolet rays in the liquid crystal layer, to initially align the liquid crystal molecules.

The method may further include, after the step of initially aligning the liquid crystal molecules, blocking application of a voltage to the auxiliary electrode.

The step of forming a first display panel may include forming the semiconductor layer from an oxide semiconductor.

The step of applying different voltages to the pixel electrode and the common electrode may include applying a ground voltage to the gate electrode, and applying a common voltage to the auxiliary electrode and the common electrode.

The step of applying different voltages to the pixel electrode and the common electrode may include applying a ground voltage to the gate electrode, applying a common voltage to the common electrode and applying a voltage that is greater than the ground voltage and is less than the common voltage to the auxiliary electrode.

The step of applying of a voltage to the pixel electrode and the common electrode may include applying a DC voltage having an absolute value that is greater than about 0 volts to the gate electrode and applying a ground voltage to the auxiliary electrode and the common electrode.

The step of forming the liquid crystal layer on the first display panel or the second display panel may include applying a liquid crystal material to the first display panel or the second display panel.

The step of applying the liquid crystal material to the first display panel or the second display panel may include dripping the liquid crystal material.

The step of forming the first display panel having a thin film transistor includes forming, a channel of a thin film transistor from an oxide semiconductor having high mobility.

According to another aspect of the invention, a liquid crystal display includes a first display panel including a thin film transistor and a pixel electrode connected to the thin film transistor, a gate line, an auxiliary voltage line, and a data line disposed on different layers, the thin film transistor including an auxiliary electrode connected to the auxiliary voltage line, a semiconductor layer disposed on the auxiliary electrode, and a gate electrode disposed on the semiconductor layer and connected to the gate line, a second display panel including a common electrode spaced from the pixel electrode and a liquid crystal layer disposed between the first display panel and the second display panel.

The semiconductor layer may include an oxide semiconductor.

The data line and the auxiliary voltage line may extend in a same direction.

The auxiliary voltage line may extend in the same direction as the gate line and may overlap the gate line.

The liquid crystal layer may include liquid crystal molecules that are pre-aligned in a common direction.

The common direction may be a tilted direction.

The tilted direction may be angled between a substantially horizontal direction and a substantially vertical direction orthogonal to the horizontal direction.

The thin film transistor may include a channel having an oxide semiconductor with high mobility and the liquid crystal display may be a high resolution display.

According to the exemplary embodiments, the size of the initial aligning voltage applied to the liquid crystal layer may be controlled in a process for manufacturing a high-resolution liquid crystal display. Hence, the liquid crystal molecules of the liquid crystal layer are initially aligned to have a pre-tilt, thereby improving the response speed of the liquid crystal display.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
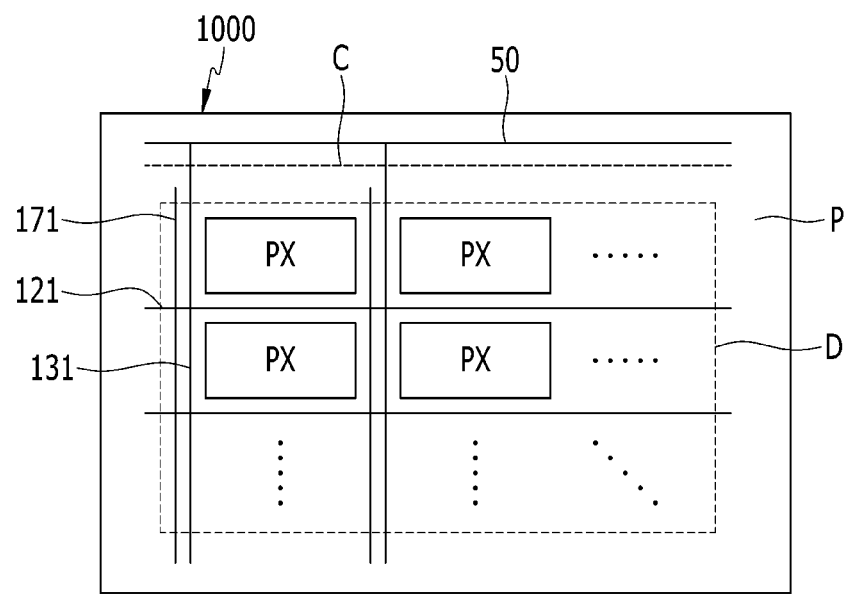
FIG. 1 is a schematic, plan view of a liquid crystal display in one stage of manufacture according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIG. 1, the liquid crystal display 1000 includes a display area (D), and a peripheral area (P) surrounding the display area (D). Further, the liquid crystal display 1000 includes a plurality of signal lines and a plurality of pixels PX disposed in a matrix form. A plurality of pixels PX is disposed in the display area (D).

In addition, the liquid crystal display 1000 includes an auxiliary voltage supplying line 50 disposed in the peripheral area.

The signal line includes a plurality of gate lines 121 for transmitting a gate signal and a plurality of data lines 171 for transmitting a data voltage. The signal line includes a plurality of auxiliary voltage lines 131 connected to the auxiliary voltage supplying line 50. A plurality of auxiliary voltage lines 131 and a plurality of data lines 171 extend in a same direction.

Figure 2:
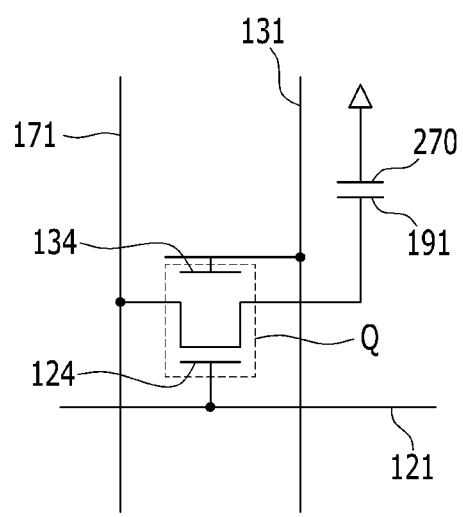
FIG. 2 is a schematic view of a circuit of one pixel of the liquid crystal display of FIG. 1.

Referring to FIG. 2, a pixel PX includes a gate line 121, a data line 171, and a thin film transistor Q connected to the auxiliary voltage line 131. The pixel PX includes a pixel electrode 191 connected to the thin film transistor Q and a common electrode 270 facing the pixel electrode 191. A liquid crystal layer (not shown in FIG. 2) is disposed between the pixel electrode 191 and the common electrode 270.

The thin film transistor Q includes a gate electrode 124 connected to the gate line 121 and an auxiliary electrode 134 connected to the auxiliary voltage line 131. The channel of the thin film transistor Q may include an oxide semiconductor.

Figure 3:
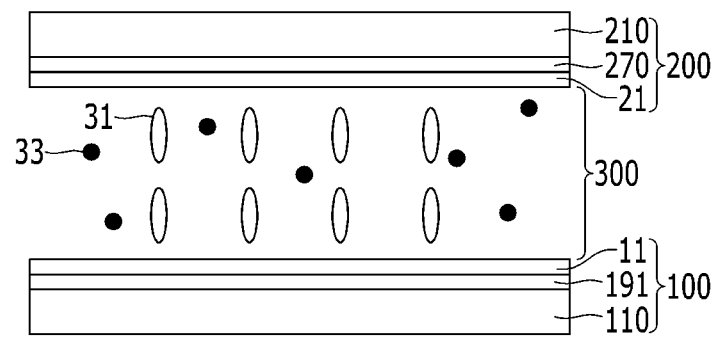
FIG. 3, FIG. 4, and FIG. 5 are schematic side views of exemplary steps in a first embodiment of a method for manufacturing the liquid crystal display of FIG. 1.

Referring to FIG. 3, when a first display panel 100 and a second display panel 200 are manufactured, a liquid crystal mixture including liquid crystal is coated on one of the first display panel 100 and the second display panel 200 by using a method such as a dripping process to thus form a liquid crystal layer 300, and the first display panel 100 is bonded to the second display panel 200.

Without being limited to this, the first display panel 100 may be bonded to the second display panel 200, and a liquid crystal mixture may be injected between the first display panel 100 and the second display panel 200 to form the liquid crystal layer 300.

The first display panel 100 includes a first substrate 110, a pixel electrode 191, and a first alignment layer 11. The first display panel 100 may further include a plurality of thin films disposed between the first substrate 110 and the pixel electrode 191. For example, as shown in FIG. 2, it may further include a thin film transistor Q connected to the gate line 121, the data line 171, and the auxiliary voltage line 131. A detailed description of the configuration of the first display panel 100 will follow subsequently.

The second display panel 200 includes a second substrate 210, a common electrode 270, and a second alignment layer 21.

The liquid crystal layer 300 includes a plurality of liquid crystal molecules 31 and a plurality of alignment aids 33.

The liquid crystal molecule 31 may have dielectric anisotropy. The alignment aid 33 may include a reactive mesogen (RM). The reactive mesogen may be a photo-reactive material, for example, an ultraviolet ray curing material.

Figure 4:
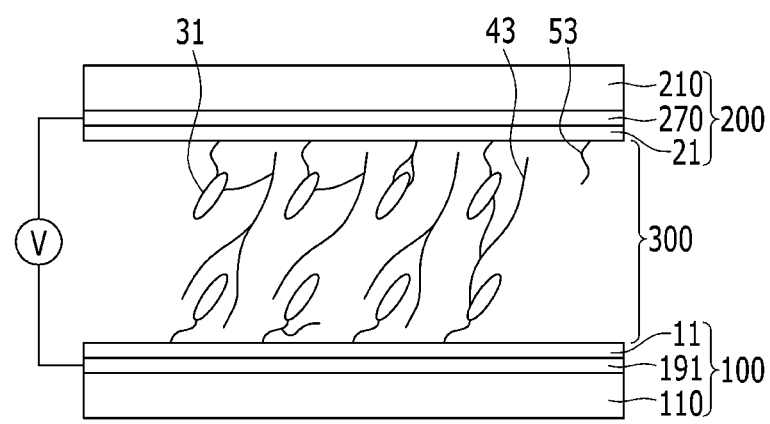
Figure 5:
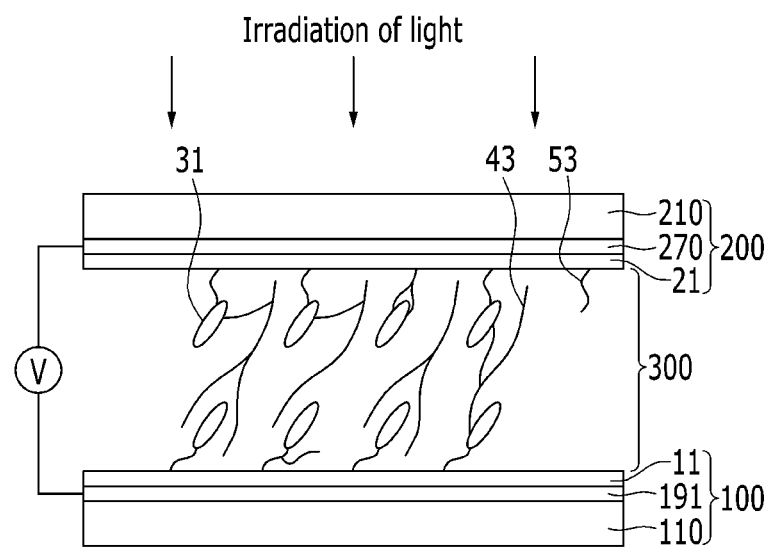

Referring to FIG. 4, a voltage V is supplied to the pixel electrode 191 and the common electrode 270 to generate an electric field to the liquid crystal layer 300. Referring to FIG. 5, ultraviolet rays are irradiated in the liquid crystal layer 300 to perform an initial alignment so that liquid crystal molecules 31 are pre-tilted.

When an electric field is generated to the liquid crystal layer 300, the liquid crystal molecules 31 are inclined in response to the electric field. When the ultraviolet rays are irradiated, the alignment aid 33 is cured while inclined according to the inclined liquid crystal molecules 31 to thus form polymers 43 and 53. The alignment aid 33 disposed near the first alignment layer 11 and the second alignment layer 21 may be cured in a substantially vertical direction with respect to the first substrate 110 and the second substrate 210, and the alignment aid 33 may be cured while inclined in a like manner relative to the liquid crystal molecules 31 as the alignment aid 33 extends between the first alignment layer 11 and the second alignment layer 21 in forming the polymers 43 and 53.

When an electric field is generated in the liquid crystal layer 300, as shown in FIG. 2, the voltage applied to the gate line 121 and the auxiliary voltage line 131 is applied to the gate electrode 124 and the auxiliary electrode 134 to turn on the thin film transistor Q, and the voltage transmitted through the data line 171 is transmitted to the pixel electrode 191. A voltage is applied to the common electrode 270, and an electric field is generated to the liquid crystal layer 300 by a difference between the voltage applied to the pixel electrode 191 and the voltage applied to the common electrode 270.

In this instance, a ground voltage, for example, 0 volts, may be applied to the gate line 121 and the data line 171, and a common voltage Vcom may be applied to the auxiliary voltage line 131 and the common electrode 270. When the common voltage is applied to the auxiliary voltage line 131, the amount of current flowing to a channel of the thin film transistor increases so when the ground voltage is applied to the gate line 121, the voltage applied to the data line 171 is transmitted to the pixel electrode 191 and the ground voltage is maintained at the pixel electrode 191. Therefore, a voltage difference is generated between the pixel electrode 191 and the common electrode 270 to form an electric field on the liquid crystal layer 300.

Without being limited to this, the ground voltage, for example, 0 volts, may be applied to the gate line 121, and the common voltage may be applied to the common electrode 270. An exposure voltage that is greater than the ground voltage and is less than the common voltage may be applied to the auxiliary voltage line 131.

Without being limited to this, a lower plate voltage, for example, a DC voltage with an absolute value that is greater than 0 may be applied to the gate line 121, and the ground voltage may be applied to the auxiliary voltage line 131 and the common electrode 270.

As described, during the initial aligning process providing the liquid crystal molecules 31 with a pre-tilt, the current flowing to the channel of the thin film transistor increases by applying a voltage that is different from the voltage(s) applied to the gate electrode 124 and to the auxiliary electrode 134, so a voltage difference occurs between the pixel electrode 191 and the common electrode 270 to generate an electric field to the liquid crystal layer 300.

After the liquid crystal molecules 31 are pre-tilted, then, referring again to FIG. 1, the electrical connection between the auxiliary voltage supplying line 50 and the auxiliary voltage line 131 is broken and/or blocked, for example, by physically cutting along cutting line (C).

When the electric field is removed from the liquid crystal layer 300, the liquid crystal molecules 31 may maintain their pre-tilted, aligned state due to the cured alignment aid 33, that is, the polymers 43 and 53. When an electric field is generated in the liquid crystal layer 300 after the liquid crystal display 1000 is manufactured, the liquid crystal molecules 31 may be instantly or nearly instantaneously inclined in a predetermined direction by the pre-tilt, thereby improving the response speed of the liquid crystal display 1000 and reducing an afterimage.

In contrast to the embodiment of FIG. 3, FIG. 4, and FIG. 5, the alignment aid 33 may be included in the first alignment layer 11 and the second alignment layer 21, as described below in connection with the embodiment described with respect to FIGS. 6-8.

Figure 6:
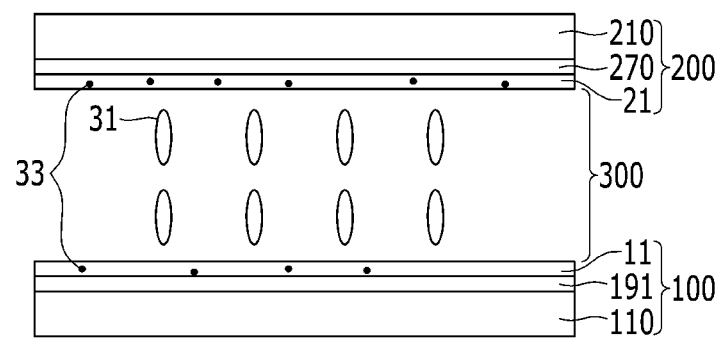
FIG. 6, FIG. 7, and FIG. 8 are schematic side views of exemplary steps in a second embodiment of a method for manufacturing the liquid crystal display of FIG. 1.

Referring to FIG. 6, when the first display panel 100 and the second display panel 200 are provided, a liquid crystal mixture including liquid crystal molecules is coated on one of the first display panel 100 and the second display panel 200 by using a method such as a dripping process to form a liquid crystal layer 300, and the first display panel 100 is bonded to the second display panel 200.

Without being limited to this, when the first display panel 100 is bonded to the second display panel 200, a liquid crystal mixture may be injected between the first display panel 100 and the second display panel 200 to form a liquid crystal layer 300.

The first display panel 100 includes a first substrate 110, a pixel electrode 191, and a first alignment layer 11. The first display panel 100 may further include a plurality of thin films disposed between the first substrate 110 and the pixel electrode 191. For example, as shown in FIG. 2, the first display panel 100 may further include a thin film transistor Q connected to the gate line 121, the data line 171, and the auxiliary voltage line 131. A detailed description of the configuration of the first display panel 100 will follow subsequently.

The second display panel 200 includes a second substrate 210, a common electrode 270, and a second alignment layer 21.

The first alignment layer 11 and the second alignment layer 21 respectively include a plurality of alignment aids 33. The alignment aid 33 may include a reactive mesogen (RM). The reactive mesogen may be a photo-reactive material, for example, an ultraviolet ray curable material.

The liquid crystal layer 300 includes a plurality of liquid crystal molecules 31. The liquid crystal molecules 31 may have dielectric anisotropy.

Figure 7:
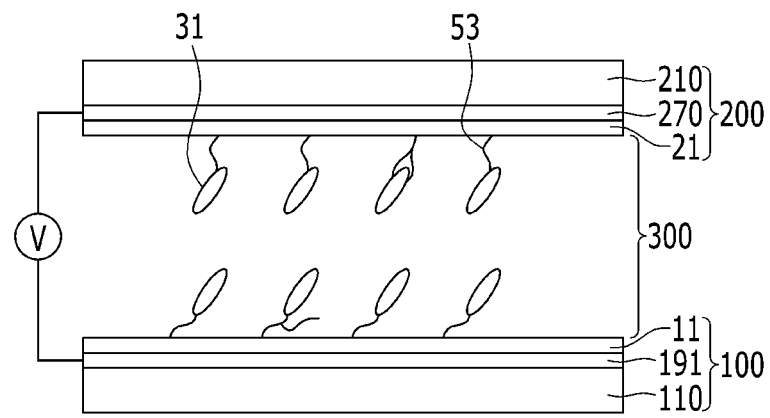

Referring to FIG. 7, a voltage is applied to the pixel electrode 191 and the common electrode 270 to generate an electric field in the liquid crystal layer 300. Referring to FIG. 8, the ultraviolet rays are irradiated in the liquid crystal layer 300 to perform an initial alignment so that the liquid crystal molecules 31 are pre-tilted.

When the electric field is generated in the liquid crystal layer 300, the liquid crystal molecules 31 are inclined in response to the electric field. When the ultraviolet rays are irradiated, the alignment aids 33 included in the first alignment layer 11 and the second alignment layer 21 are cured while connected to the inclined liquid crystal molecules 31, to thus form a polymer 53. The polymer 53 may be connected to side-chains of the first alignment layer 11 and the second alignment layer 21.

When the electric field is removed from the liquid crystal layer 300, the liquid crystal molecules 31 may maintain their aligned, pre-tilted state due to by the cured alignment aid 33, that is, the polymer 53. When an electric field is generated in the liquid crystal layer 300 after the liquid crystal display 1000 is manufactured, the liquid crystal molecules 31 may be instantly or nearly instantaneously inclined in a predetermined direction by a pre-tilt, thereby improving the response speed of the liquid crystal display 1000 and reducing an afterimage.

The step of applying the voltage to the pixel electrode 191 and the common electrode 270 when an electric field is generated in the liquid crystal layer 300 corresponds to the exemplary method for manufacturing a liquid crystal display described with reference to FIG. 3, FIG. 4, and FIG. 5.

An example of a configuration of a liquid crystal display made by a method for manufacturing according to the principles of the invention will now be described with reference to FIG. 9 and FIG. 10.

Figure 9:
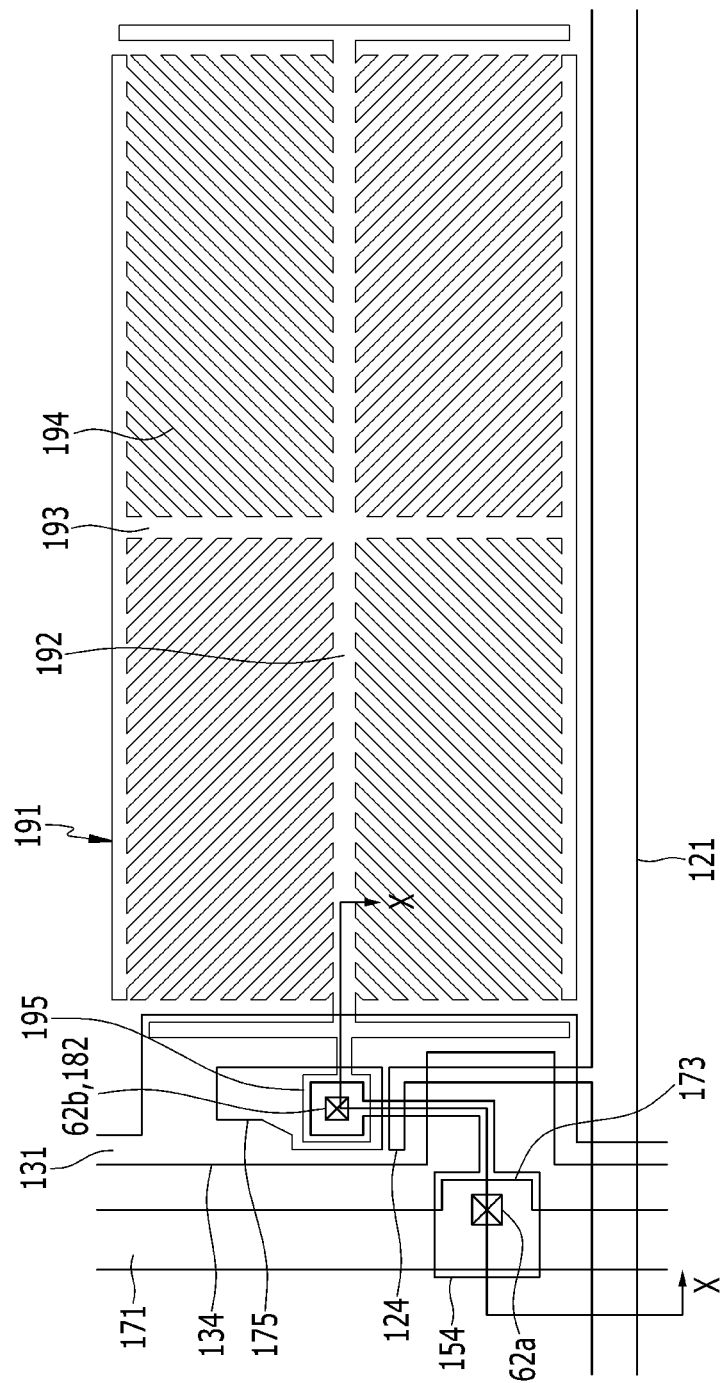
FIG. 9 is a schematic, plan view of a first embodiment of one pixel of a liquid crystal display manufactured according to the principles of the invention.
Figure 10:
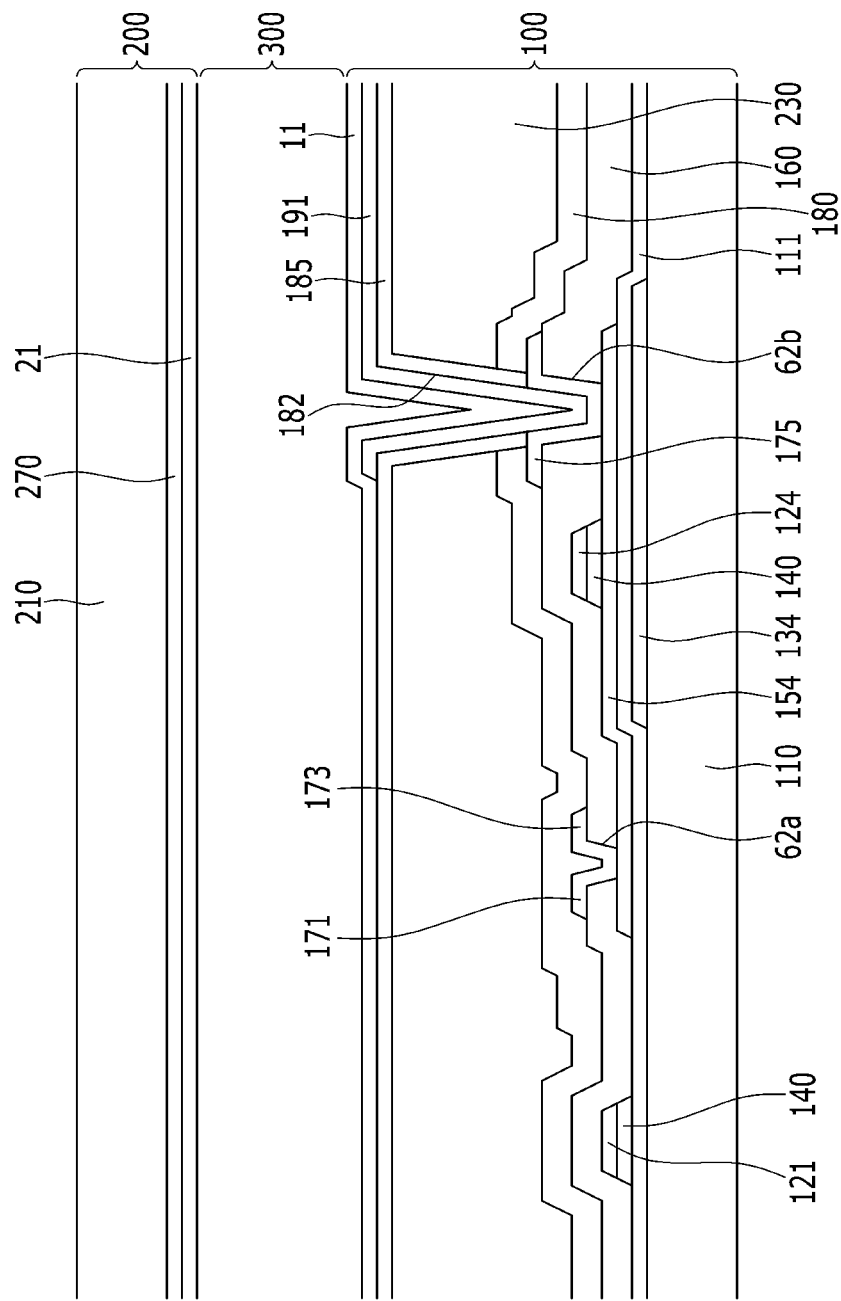
FIG. 10 is a fragmented, side sectional view of the liquid crystal display of FIG. 9 taken along line X-X.

Referring to FIG. 9 and FIG. 10, the liquid crystal display includes a first display panel 100 and a second display panel 200 facing each other, and a liquid crystal layer 300 disposed between the first display panel 100 and the second display panel 200.

The first display panel 100 will now be described.

An auxiliary voltage line 131 is disposed on a first substrate 110 made of an insulating material including transparent glass or plastic. The auxiliary voltage line 131 mainly extends in the vertical direction, and includes an auxiliary electrode 134 that is wider than the auxiliary voltage line 131.

A buffer layer 111 is disposed on the auxiliary voltage line 131. The buffer layer 111 includes a silicon oxide (SiOx) or a silicon nitride (SiNx).

A semiconductor layer 154 is disposed on the buffer layer 111. The semiconductor layer 154 includes a portion overlapping the auxiliary electrode 134. The semiconductor layer 154 includes respective ends portions that are wider than other portions. One of the respective end portions of the semiconductor layer 154 overlaps the auxiliary electrode 134. The semiconductor layer 154 includes an oxide semiconductor.

A gate insulating layer 140 is disposed on the buffer layer 111 and the semiconductor layer 154. The gate insulating layer 140 includes a silicon oxide (SiOx) or a silicon nitride (SiNx).

A gate line 121 including a gate electrode 124 is disposed on the gate insulating layer 140. The gate line 121 mainly extends in the horizontal direction, and crosses the auxiliary voltage line 131. The gate electrode 124 extends from the gate line 121, and includes a portion overlapping the semiconductor layer 154 and the auxiliary electrode 134. The gate line 121 and the auxiliary voltage line 131 may include a same material.

An interlayer insulating layer 160 is disposed on the buffer layer 111, the semiconductor layer 154, and the gate line 121. The interlayer insulating layer 160 includes a source electrode contact hole 62a and a drain electrode contact hole 62b overlapping the semiconductor layer 154. The interlayer insulating layer 160 includes a silicon oxide (SiOx) or a silicon nitride (SiNx).

A data line 171 including a source electrode 173 and a drain electrode 175 is disposed on the interlayer insulating layer 160. The data line 171 extends in the vertical direction that is the same as the direction in which the auxiliary voltage line 131 extends, and crosses the gate line 121. The source electrode 173 protrudes from the data line 171 and is connected to the semiconductor layer 154 through the source electrode contact hole 62a. The drain electrode 175 is separated from the data line 171 and is connected to the semiconductor layer 154 through the drain electrode contact hole 62b.

The gate electrode 124, the source electrode 173, and the drain electrode 175 configure a thin film transistor together with the semiconductor layer 154, and the channel of the thin film transistor is formed on the semiconductor layer 154 at a portion overlapping the gate electrode 124. The thin film transistor includes a gate electrode 124 and an auxiliary electrode 134 overlapping the channel.

The auxiliary electrode 134 overlapping the channel of the thin film transistor may prevent external light from being input to the channel of the thin film transistor. As described with reference to the manufacturing method, the electrical connection of the auxiliary voltage supplying line 50 and the auxiliary voltage line 131 is blocked and/or broken, for example, by physically cutting along the cutting line (C), so no voltage is applied to the auxiliary electrode 134.

A passivation layer 180 is disposed on the data line 171, the drain electrode 175, and the interlayer insulating layer 160. The passivation layer 180 includes a silicon oxide (SiOx) or a silicon nitride (SiNx).

A color filter 230 is disposed on the passivation layer 180. The color filter 230 may display one of the primary colors of red, green, and blue.

The passivation layer 180 and the color filter 230 do not overlap the drain electrode contact hole 62b.

A capping layer 185 is disposed on the color filter 230. The capping layer 185 covers sides of the color filter 230 and the passivation layer 180, and includes a pixel electrode contact hole 182 overlapping the drain electrode 175. The capping layer 185 may include a silicon oxide (SiOx) or a silicon nitride (SiNx), may prevent the color filter 230 from separating or coming apart from the other layers, and may control contamination of the liquid crystal layer 300 caused by an organic material such as a solvent input from the color filter 230.

A pixel electrode 191 connected to the drain electrode 175 through the pixel electrode contact hole 182 is disposed on the capping layer 185.

The shape of the pixel electrode 191 may be a quadrangle including a pair of long sides and a pair of short sides. The pair of long sides of the pixel electrode 191 extend in the same direction as the direction in which the gate line 121 extends, and the pair of short sides extend in the same direction as the direction in which the data line 171 and the auxiliary voltage line 131 extend.

The pixel electrode 191 includes a first stem 192, a second stem 193, a plurality of fine branches 194, and a protrusion 195. The first stem 192 intersects the second stem 193, and the plurality of fine branches 194 extend obliquely from the first stem 192 and the second stem 193.

The pixel electrode 191 is divided into four sub-regions by the first stem 192 and the second stem 193 intersecting each other. The crossing of the first stem 192 and the second stem 193 may be orthogonal. A fine branch 194 disposed in a top left direction of the first stem 192 and the second stem 193 extends to be oblique in a top left direction from the first stem 192 and the second stem 193. A fine branch 194 disposed in a top right direction of the first stem 192 and the second stem 193 extends to be oblique in a top right direction from the first stem 192 and the second stem 193. A fine branch 194 disposed in a bottom left direction of the first stem 192 and the second stem 193 extends to be oblique in a bottom left direction from the first stem 192 and the second stem 193. A fine branch 194 disposed in a bottom right direction of the first stem 192 and the second stem 193 extends to be oblique in a bottom right direction from the first stem 192 and the second stem 193.

The pixel electrode 191 is connected to the drain electrode 175 through the pixel electrode contact hole 182 from the protrusion 195, and receives a data voltage from the drain electrode 175.

A first alignment layer 11 is disposed on the pixel electrode 191.

The second display panel 200 will now be described.

A common electrode 270 is disposed on a first side of a second substrate 210 made of an insulating material including transparent glass or plastic, and a second alignment layer 21 is disposed on a first side of the common electrode 270.

The common electrode 270 receives the common voltage, and the second alignment layer 21 faces the first alignment layer 11 with the liquid crystal layer 300 therebetween.

The first alignment layer 11 and the second alignment layer 21 may be vertical alignment layers.

Figure 8:
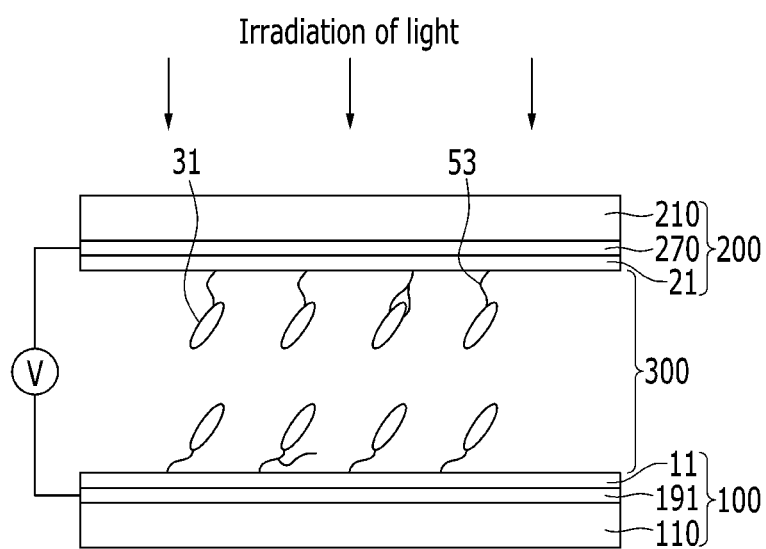

As shown in FIG. 5 and FIG. 8, the liquid crystal layer 300 includes a plurality of liquid crystal molecules 31 with dielectric anisotropy, and, after the manufacturing process is completed, the liquid crystal molecules 31 are disposed in a pre-tilted alignment when there is no electric field is applied. Here, the liquid crystal molecules 31 may be pre-tilted in a direction parallel to the length direction of the fine branch 194.

The liquid crystal layer 300 may further include an alignment aid. In this case, the first alignment layer 11 and the second alignment layer 21 include no alignment aid.

In addition, the first alignment layer 11 and the second alignment layer 21 may include an alignment aid, and in embodiments such as that, the liquid crystal layer 300 includes no alignment aid.

The auxiliary voltage line 131 may extend in the same direction as the gate line 121, differing from the liquid crystal display of FIG. 9 and FIG. 10.

Figure 11:
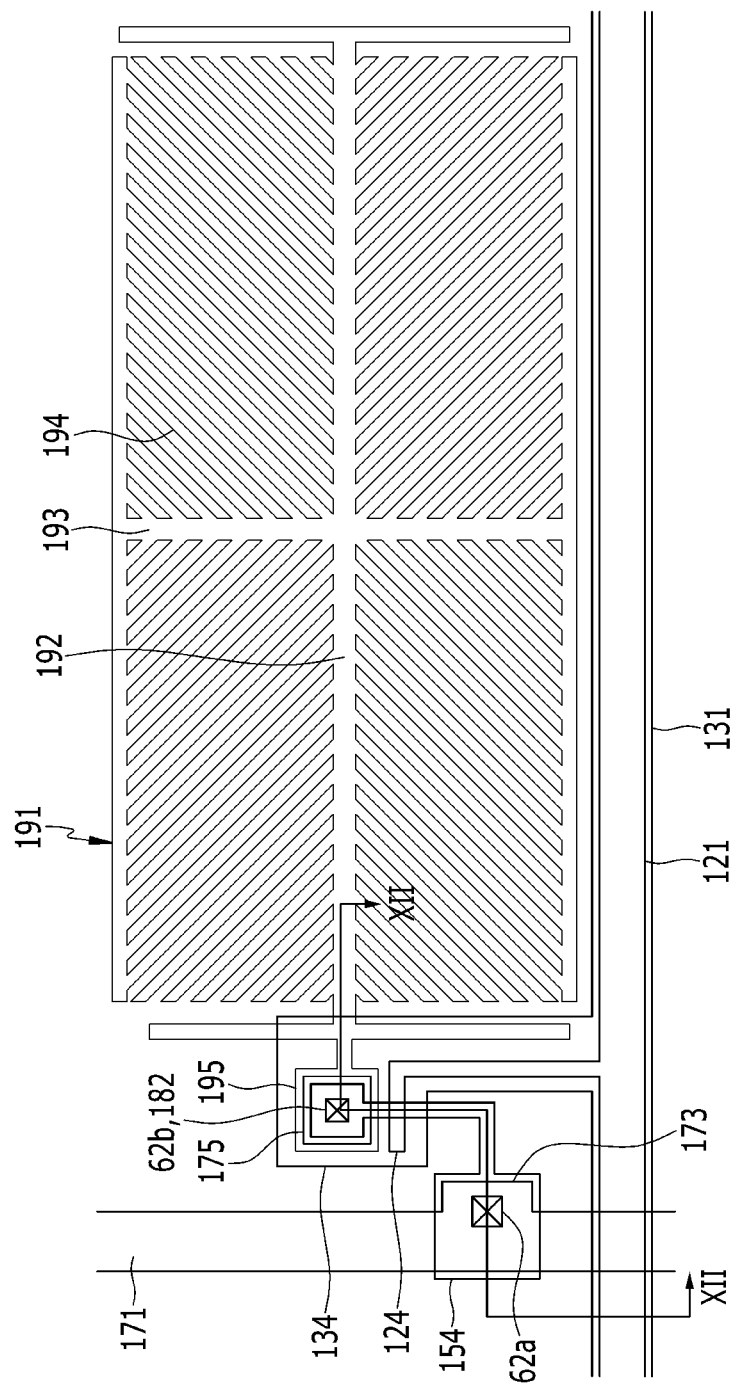
FIG. 11 is a schematic, plan view of a second embodiment of one pixel of a liquid crystal display manufactured according to the principles of the invention.
Figure 12:
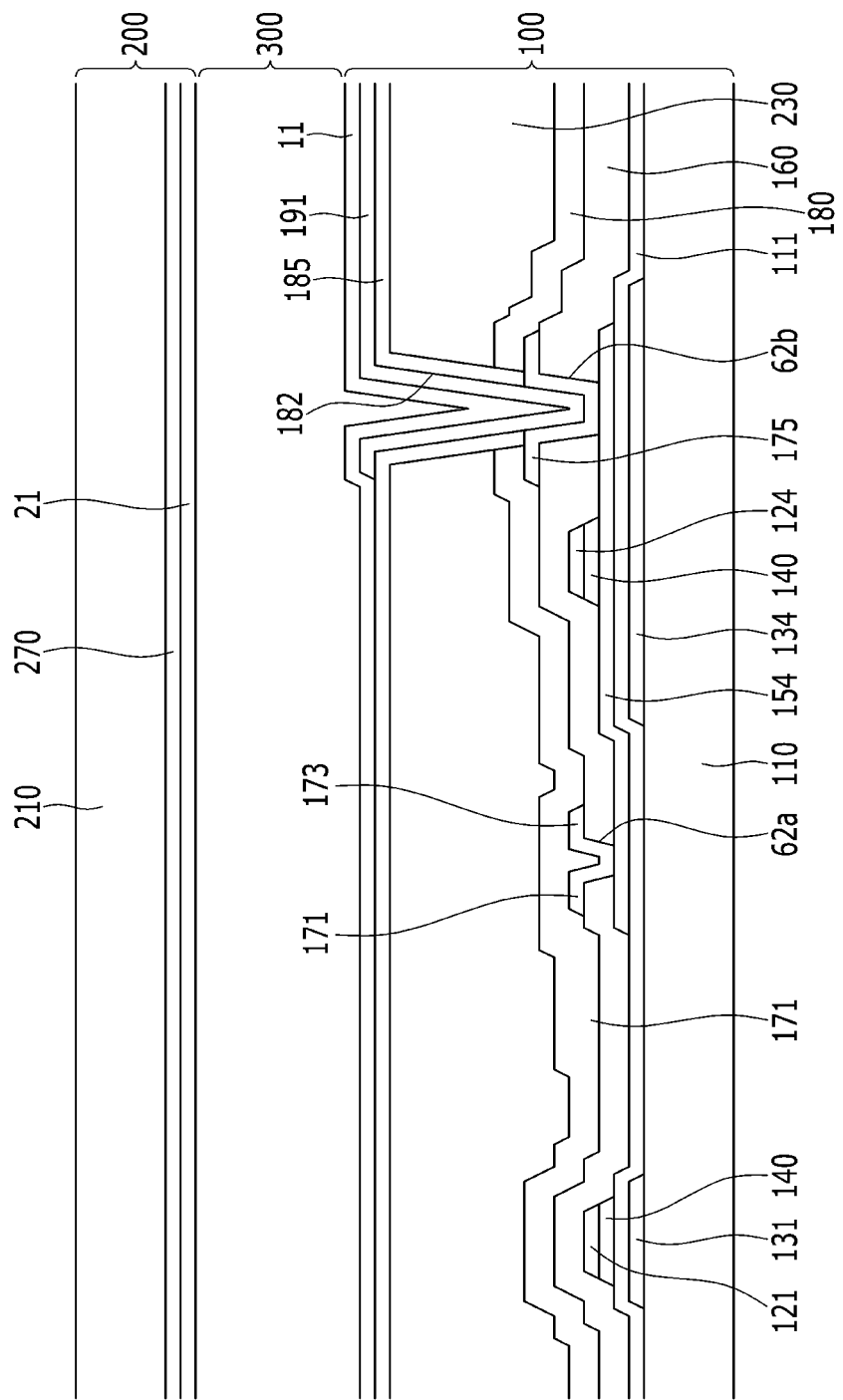
FIG. 12 is a fragmented, side sectional view of the liquid crystal display of FIG. 11 taken along line XII-XII.

Referring to FIG. 11 and FIG. 12, the embodiment of the liquid crystal display depicted corresponds to the liquid crystal display described with reference to FIG. 9 except for the configuration of the auxiliary voltage line, the auxiliary electrode, and the drain electrode. Like components will not be described to avoid redundancy.

An auxiliary voltage line 131 including an auxiliary electrode 134 is disposed on a first substrate 110. The auxiliary voltage line 131 extends in the horizontal direction that is the same as the direction in which the gate line 121 extends, and it overlaps the gate line 121.

The auxiliary electrode 134 protrudes from the auxiliary voltage line 131 and overlaps part of the gate electrode 124 and the semiconductor layer 154.

The drain electrode 175 is separated from the data line 171, is disposed on the interlayer insulating layer 160, and is connected to the semiconductor layer 154 through the drain electrode contact hole 62b. The drain electrode 175 has an area smaller than the area of the drain electrode of the liquid crystal display shown in FIG. 9. However, the area of the drain electrode 175 may also be equal to or greater than that of the drain electrode of the liquid crystal display of FIG. 9.

The liquid crystal display described with reference to FIG. 9 and FIG. 11 has a structure in which a pair of long sides of the pixel electrode extend in the same direction as the direction in which the gate line 121 extends, and without being limited to this, a pair of long sides of the pixel electrode may extend in the same direction as the direction in which the data line 171 extends.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method for manufacturing a liquid crystal display, comprising the steps of:
    forming a first display panel including a thin film transistor and a pixel electrode connected to the thin film transistor;
    forming a second display panel including a common electrode;
    forming a liquid crystal layer including a plurality of liquid crystal molecules on the first display panel or the second display panel;
    bonding the first display panel and the second display panel;
    applying different voltages to the pixel electrode and the common electrode; and
    irradiating ultraviolet rays in the liquid crystal layer to initially align the liquid crystal molecules,
    wherein the thin film transistor comprises:
        an auxiliary electrode;
        a semiconductor layer disposed on the auxiliary electrode;
        a gate electrode disposed on the semiconductor layer;
        a source electrode connected to the semiconductor layer; and
        a drain electrode connected to the semiconductor layer and the pixel electrode.

2. The method of claim 1, further comprising,
after the step of initially aligning the liquid crystal molecules,
blocking application of a voltage to the auxiliary electrode.

3. The method of claim 1, wherein the step of forming a first display panel comprises:
    forming the semiconductor layer from an oxide semiconductor.

4. The method of claim 1, wherein
the step of applying different voltages to the pixel electrode and the common electrode comprises:
    applying a ground voltage to the gate electrode, and
    applying a common voltage to the auxiliary electrode and the common electrode.

5. The method of claim 1, wherein
the step of applying of different voltages to the pixel electrode and the common electrode comprises:
    applying a ground voltage to the gate electrode;
    applying a common voltage to the common electrode; and
    applying a voltage that is greater than the ground voltage and is less than the common voltage to the auxiliary electrode.

6. The method of claim 1, wherein
the step of applying different voltages to the pixel electrode and the common electrode comprises:
    applying a DC voltage having an absolute value that is greater than about 0 volts to the gate electrode; and
    applying a ground voltage to the auxiliary electrode and the common electrode.

7. The method of claim 1, wherein the step of forming the liquid crystal layer on the first display panel or the second display panel comprises applying a liquid crystal material to the first display panel or the second display panel.

8. The method of claim 7, wherein the step of applying the liquid crystal material to the first display panel or the second display panel comprises dripping the liquid crystal material.

9. The method of claim 1, wherein the step of forming the first display panel including a thin film transistor comprises forming, a channel of a thin film transistor from an oxide semiconductor having high mobility.

* * * * *